United States Patent [19]
Jacobs et al.

[11] Patent Number: 6,050,889
[45] Date of Patent: Apr. 18, 2000

[54] APPARATUS FOR DIVIDING A PIECE OF MEAT CONTAINING A BONE STRUCTURE

[75] Inventors: Thomas Gerardus Maria Jacobs, Doetinchem; Sander Antonie van Ochten, Lichtenvoorde, both of Netherlands

[73] Assignee: Stork R.M.S. B.V., Lichtenvoorde, Netherlands

[21] Appl. No.: 09/099,231

[22] Filed: Jun. 17, 1998

Related U.S. Application Data

[63] Continuation of application No. 08/639,364, Apr. 26, 1996, abandoned.

[30] Foreign Application Priority Data

Apr. 28, 1995 [NL] Netherlands ............ 1000260

[51] Int. Cl.$^7$ ......................................... A22B 5/20
[52] U.S. Cl. ................................. 452/160; 452/152
[58] Field of Search ................... 452/160, 152, 452/153, 155

[56] References Cited

U.S. PATENT DOCUMENTS

| | | |
|---|---|---|
| 2,198,814 | 4/1940 | Hart . |
| 2,254,188 | 8/1941 | Poppenga . |
| 2,634,457 | 4/1953 | Moyer . |
| 3,829,932 | 8/1974 | Griss ................................ 452/160 |
| 4,109,347 | 8/1978 | Jolin . |
| 4,455,712 | 6/1984 | Skaiaa . |
| 4,507,822 | 4/1985 | Herubel . |
| 4,597,132 | 7/1986 | Elmer et al. .................... 402/162 |
| 4,970,756 | 11/1970 | Durand ............................ 452/160 |
| 5,421,772 | 6/1995 | Durand . |
| 5,456,267 | 10/1995 | Stark ................................ 128/898 |

FOREIGN PATENT DOCUMENTS

| | | |
|---|---|---|
| 0258937 | 3/1988 | European Pat. Off. . |
| 850061 | 1/1977 | France . |
| 2551950 | 3/1985 | France . |
| 2576183 | 7/1986 | France . |
| 2807766 | 8/1979 | Germany . |
| 7707771 | 1/1979 | Netherlands . |
| 8004364 | 2/1981 | Netherlands . |
| 438491 | 11/1935 | Norway . |
| 546539 | 3/1974 | Switzerland . |
| 609213 | 2/1979 | Switzerland . |

*Primary Examiner*—Willis Little
*Attorney, Agent, or Firm*—Webb Ziesenheim Lodgson Orkin & Hanson, P.C.

[57] ABSTRACT

The invention relates to an apparatus for dividing a piece of meat containing at least one elongate bone structure, for example a spinal column, such that this elongate bone structure is also divided. The apparatus includes for this purpose a positioning assembly for positioning the piece of meat and a continuously movable knife for dividing a positioned piece of meat. The invention also relates to an apparatus for removing marrow from at least one piece of bone.

36 Claims, 18 Drawing Sheets

Fig. 2

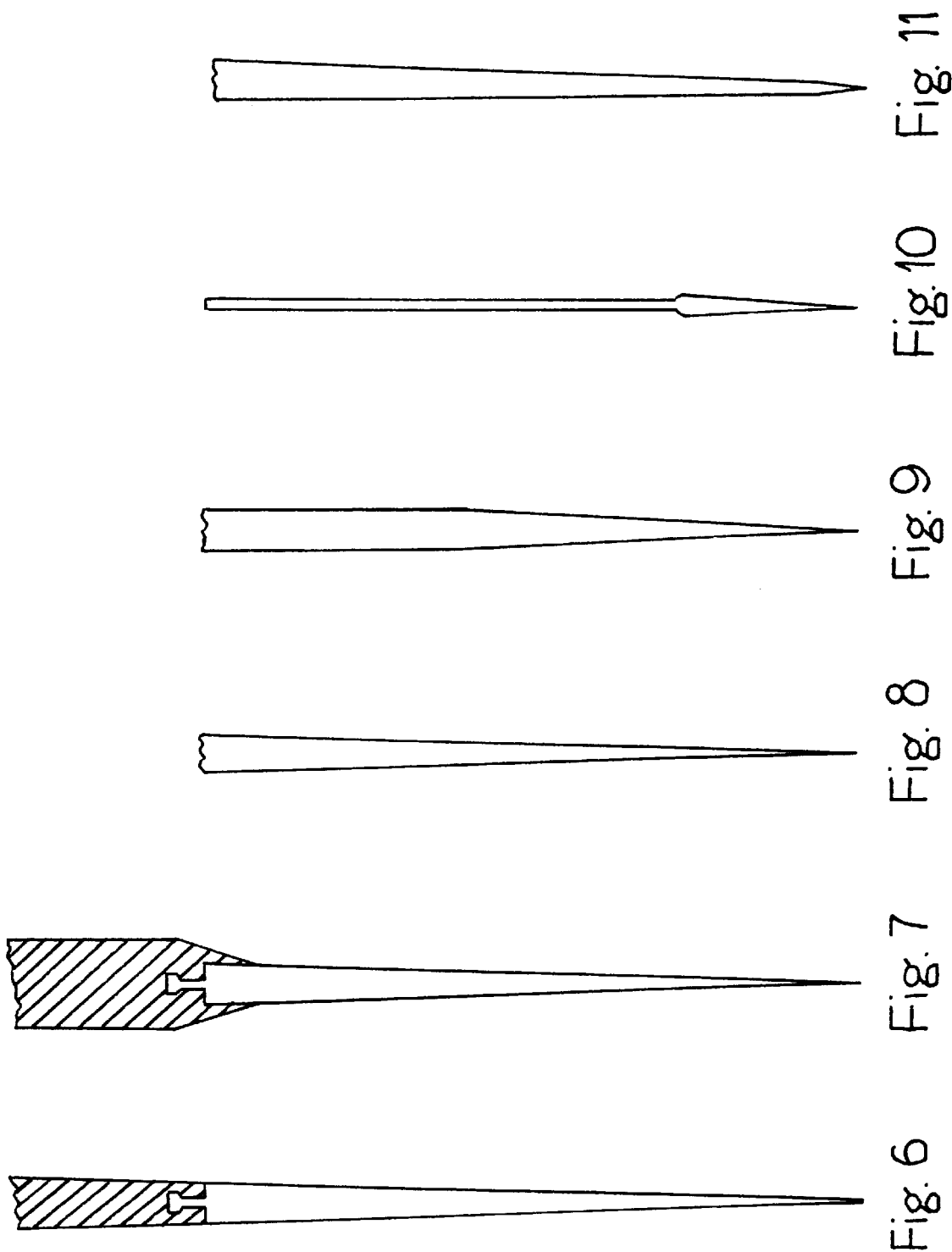

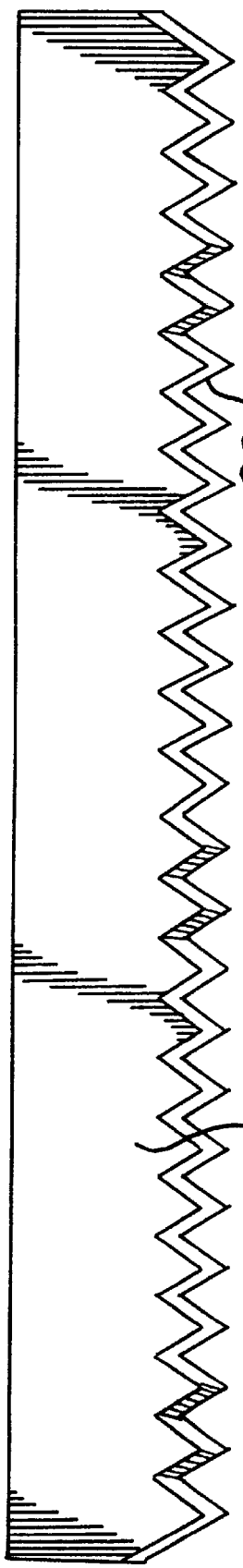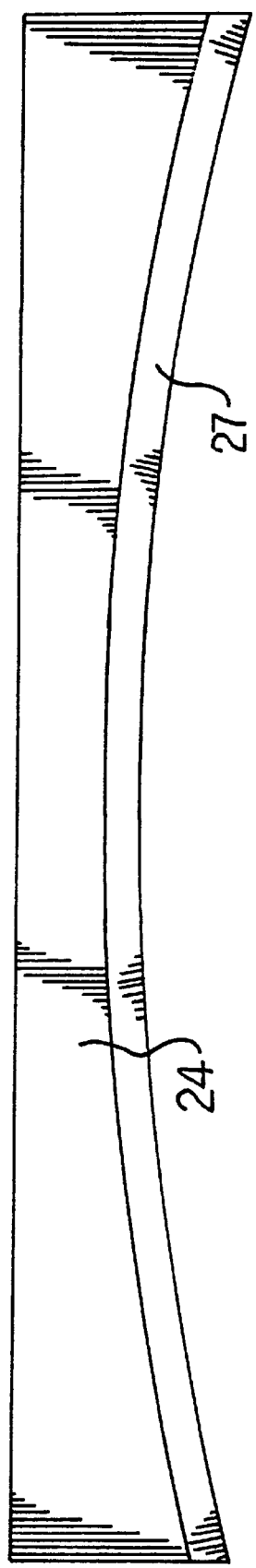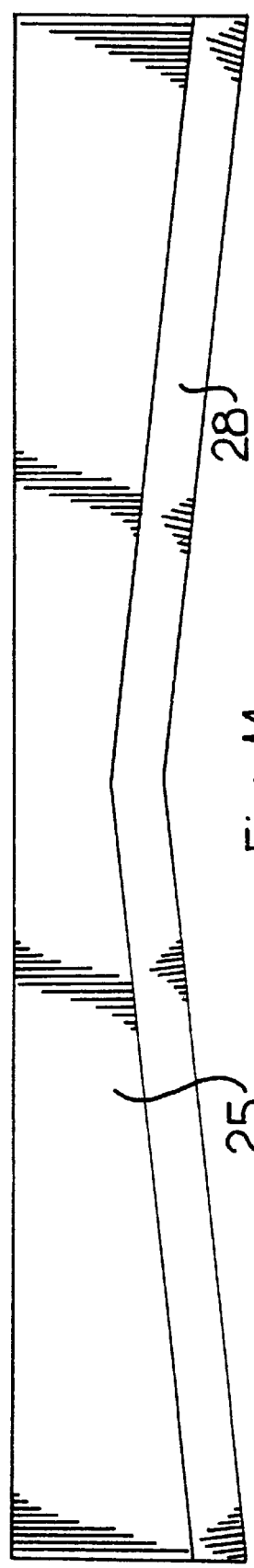

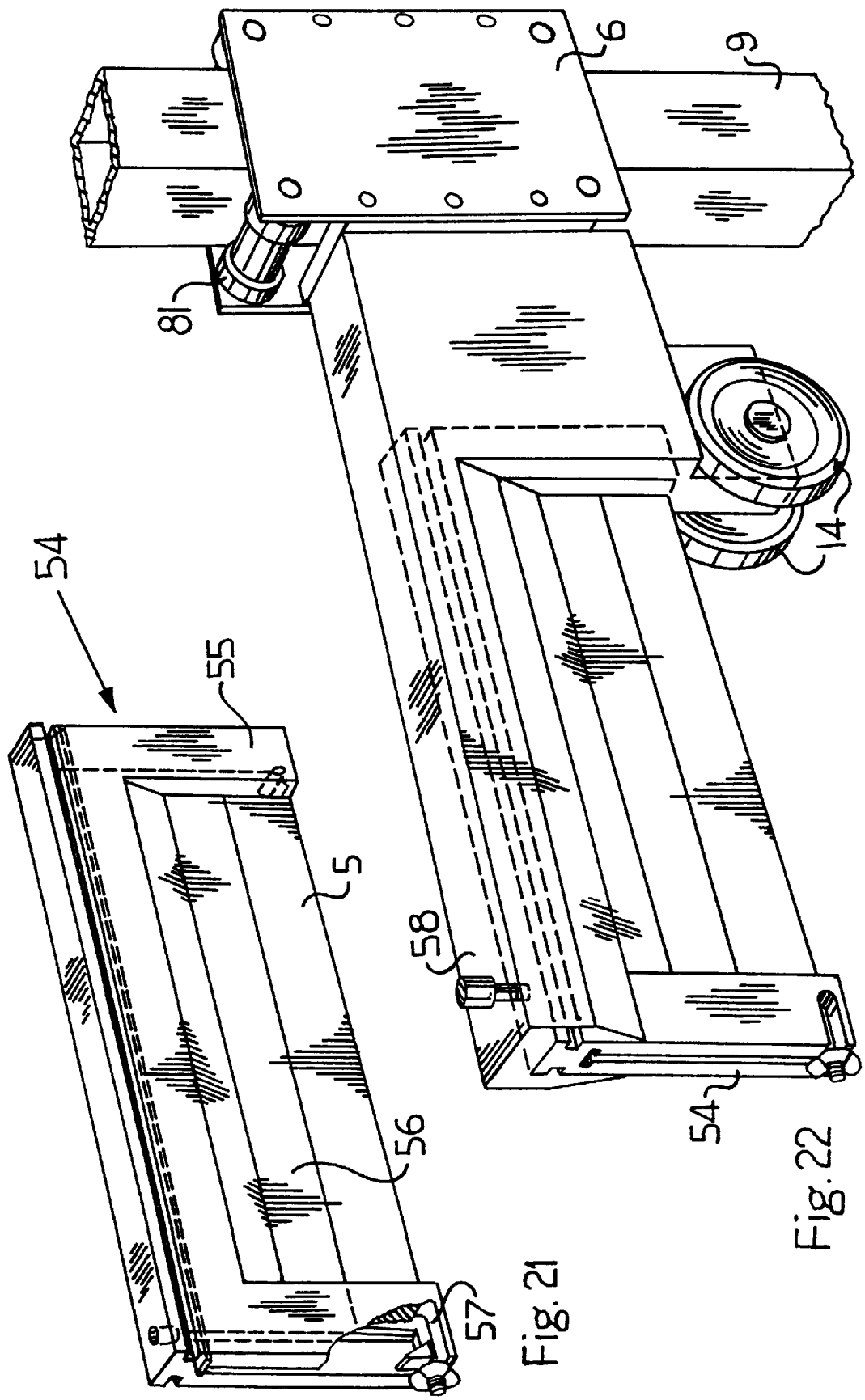

2

APPARATUS FOR DIVIDING A PIECE OF MEAT CONTAINING A BONE STRUCTURE

CROSS-REFERENCE TO RELATED APPLICATION

This application is a continuation of U.S. patent application Ser. No. 08/639,364, filed Apr. 26, 1996 and entitled "Apparatus for Dividing a Piece of Meat Containing a Bone Structure", now abandoned.

BACKGROUND OF THE INVENTION

The invention relates to an apparatus for dividing a piece of meat containing an elongated bone structure. Such an apparatus is for instance known from CH-A-546 539, BE-A-850 061, CH-A-609 213, NL-A-80 04364 and DE-A-28 07 766.

The known art makes use of great accelerations to which the dividing tool is subjected. Use is made for example of a knife-like tool which is moved reciprocally with force so that the dividing operation can be characterized as a hacking operation. Small bone splinters which adversely affect the quality of the meat can herein not be prevented from being broken off the bone. In the case of cutting and sawing contamination and smearing occurs. There is moreover the danger with cutting that the cutting tool becomes jammed in the cut made in the bone. In a treatment which could be designated as ramming, a great pressure is for instance exerted repeatedly which involves a tensile force being exerted on meat and bone. Reference is made in this respect to U.S. Pat. No. 2,634,457.

It is an object of the invention to embody the dividing operation such that it proceeds very steadily but nevertheless reliably, so that the drawbacks of the known art briefly described above do not occur.

SUMMARY OF THE INVENTION

In respect of this objective the invention provides an apparatus of the stated type which has the characteristic of claim 1.

The steps according to claim 2 provide the possibility of combining a continuously forward directed movement with a for instance temporarily or periodically occurring speed variation which brings about an increased dividing force locally.

The steps according to claim 3 relate to an embodiment such that the apparatus is suitable for dividing a slaughtered animal or a part thereof.

Claim 4 provides an advantageous embodiment. The slaughtered animal can for example be suspended by the hind legs, as is per se known from the prior art, and the dividing operation takes place with downward directed movement. Under the animal's own weight the cutting zone is situated in a state of tension, which simplifies the dividing operation.

Claims 5, 6 and 7 describe a number of possible embodiments of the knife.

Claim 8 describes an embodiment in which the effectiveness of the dividing operation can be increased.

A preferred embodiment hereof is described in claim 9.

The further development thereof in claim 10 relates to an embodiment in which at each displacement position of the knife this knife makes a preselected angle. The angle is found to have a different optimum value from place to place, depending on the anatomy of the slaughtered animal.

Claim 11 provides the option of making the angle in question variable, for instance under program control.

Claim 12 provides the possibility of effectively stiffening the knife by placing it under bias. In this respect attention is drawn to the fact that according to the invention it is seen as advantageous to generally embody the knife as thinly as possible. The knife must nonetheless be embodied such that there is no danger of the knife deforming during the dividing operation. This could occur for instance if a thin knife were pushed from the rear. The knife blade can then deform.

Claim 13 provides the option of embodying the knife as it were as a ribbon, whereby a sharp part can always be transported to the work zone.

The knife preferably takes a hard form such that it is little subject to wear and therefore has a long stand-time before it becomes blunt and must be ground or replaced. In this context the knife can for instance consist at least in the region of the cutting edge of a very hard material, such as tool steel or hard metal. The steps according to claim 14 are however recommended.

In order to cause the dividing operation to take place as effectively as possible and to prevent unintentional sideways displacement, the steps according to claim 15 are recommended.

Claim 16 gives a specific embodiment.

The subsequent claim 17 describes a preferred embodiment.

A specific embodiment is stated in claim 18. The knife can herewith be moved with certain sideways variations from a flat plane of displacement. A certain optimization of the plane of displacement can be achieved herewith. If desired, this may take place with an active control.

It has been found that the steps according to claim 19 are to be recommended. Here use may be made of a self-controlling system.

An automatic reset to the rest position is obtained with the steps according to claim 20.

In order to guide the knife as easily as possible the steps according to claim 21 can be applied.

Claim 23 provides the possibility of embodying the apparatus such that the dividing operation is combined with the extraction of marrow, or spinal marrow in the case of the spinal column of the animal.

This latter embodiment can display the feature of claim 24.

An apparatus according to claims 21 and 23 can have the feature of claim 25. In this embodiment the guiding function of the pin is combined with the extraction of marrow.

Claim 27 provides the option of replacing the knife after a certain period of use. This replacement can take place for example once it has been ascertained that the knife is too blunt for further use.

This apparatus preferably displays the feature of claim 28. A tight fit avoids mechanical obstruction and contamination in relevant cases.

The exchanging of the knife can be implemented in very elegant manner as according to claim 29.

Claim 30 provides the possibility of grinding the knife for instance periodically. According to claim 31 this grinding can take place periodically during operation of the apparatus. Grinding can also take place when the apparatus is not in use, for example outside the normal use of the knife in an apparatus as according to claim 29.

The invention further relates to apparatuses as specified in claims 32, 33, 34 and 35.

BRIEF DESCRIPTION OF THE DRAWINGS

The invention will now be elucidated with reference to the annexed drawings. Herein:

FIG. 2 shows the apparatus according to FIG. 1 partially in side view, partially in longitudinal section;

FIG. 5b is a transverse side view of the pin according to FIG. 5a;

FIGS. 6, 7, 8, 9, 10 and 11 show cross sections through knives in different embodiments;

FIGS. 12, 13 and 14 show side views of knives in different embodiments;

FIG. 21 shows a partly broken away perspective view of a variant;

FIG. 22 shows in perspective view a knife with the structure according to FIG. 21;

DESCRIPTION OF THE PREFERRED EMBODIMENTS

Figure 1:
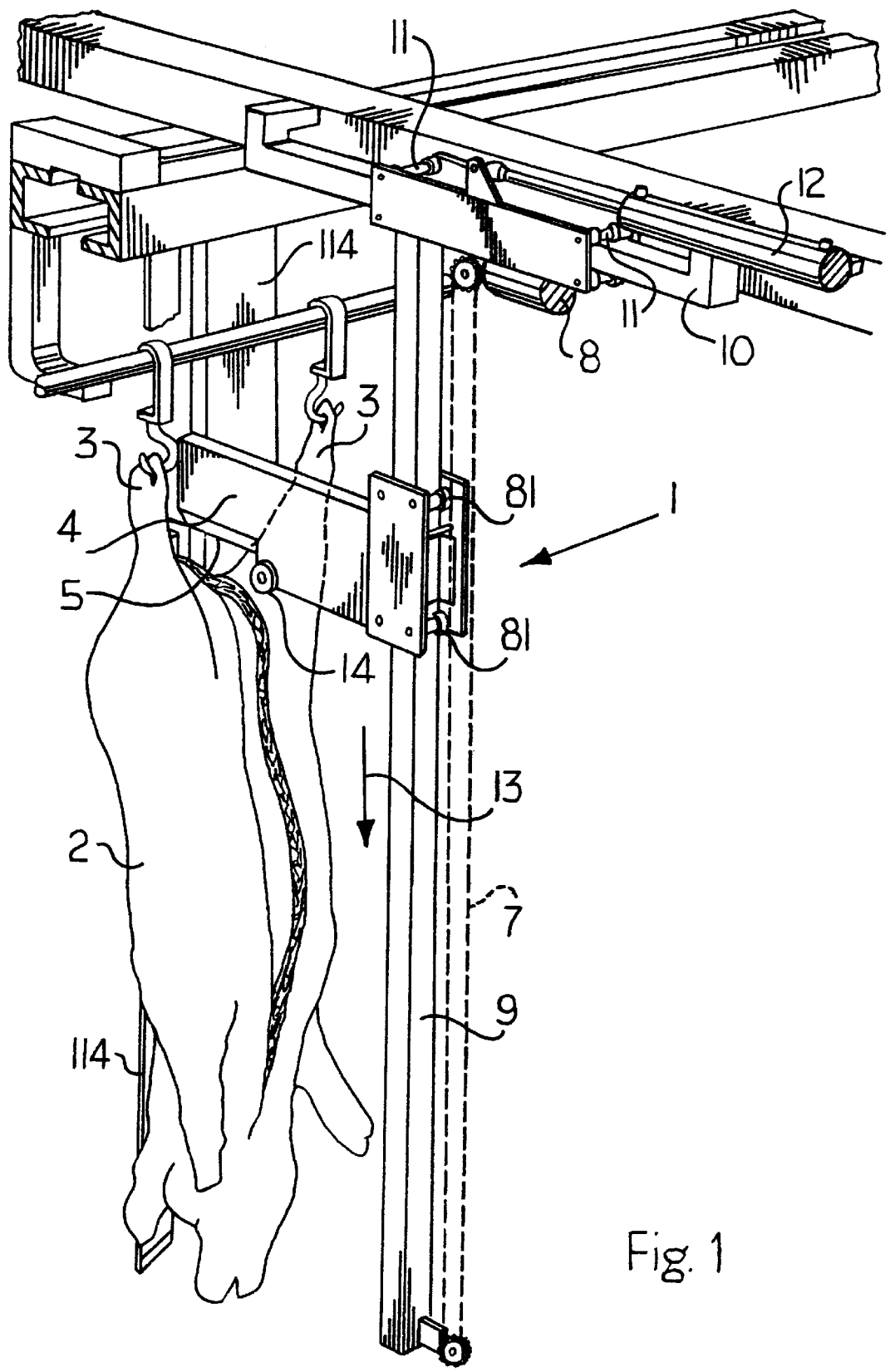
FIG. 1 shows an apparatus according to the invention in perspective view.

FIG. 1 shows an apparatus 1 according to the invention.

Suspended from its hind legs 3, a slaughtered pig 2 is transportable in per se known manner by means of per se known transporting means. The apparatus 1 serves to divide the pig 2 in the median plane through the spinal column. For this purpose use is made of a knife 4 which has a forward directed cutting edge 5 and is supported by a carriage 6 which is moveable vertically up and downward along a vertical guide 9 by means of a chain drive 7 operated by a motor 8 and is provided for this purpose with rollers 81. This guide is movable horizontally along a horizontal guide 10. Use is made for this purpose of guide rollers 11 and a linear motor 12 embodied as a hydraulic cylinder. By means of the remotely controllable motor the knife with cutting edge 5 directed forward in the effective direction of displacement 13 is displaceable only in a continuous forward directed movement at least more or less in the main plane of knife blade 4, 5 such that the plane of displacement defined by cutting edge 5 extends through the spinal column of the pig 2.

The downward directed displacement is provided by the motor 8 while the horizontally directed displacement is provided by the linear motor 12.

Figure 2:
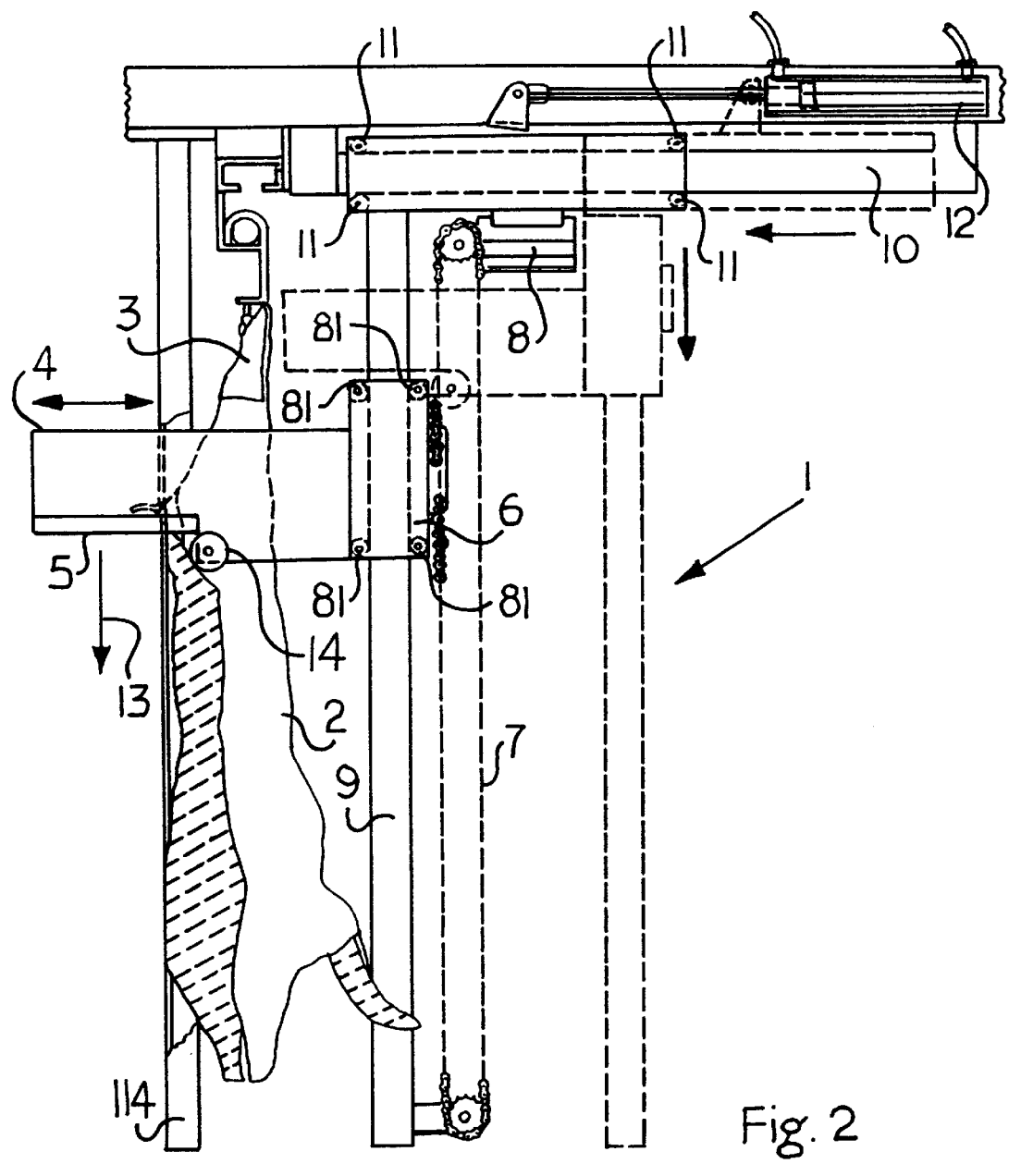

FIG. 2 shows the apparatus 1 in side view. The apparatus is shown in the operational situation with full lines while broken lines show the apparatus in the non-operational situation in which the cylinder of the linear motor 12 is retracted.

Figure 3:
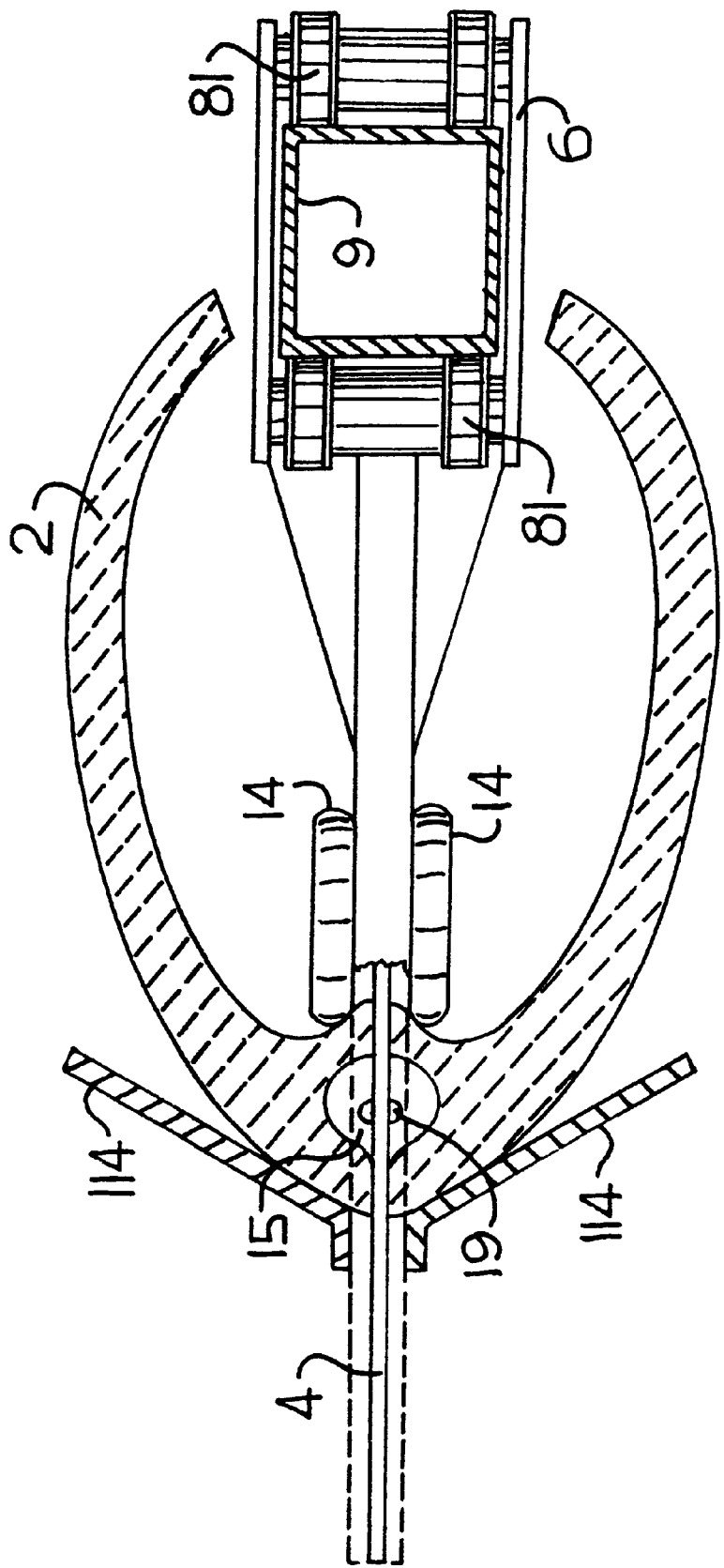
FIG. 3 shows a cross section through a part of the apparatus according to FIG. 1 and FIG. 2.

FIG. 3 shows support means 114 which hold the pig 2 in position relative to knife 4. It can be seen here that guiding rollers 14 are added to knife 4 which guide knife 4 in the manner shown in FIG. 3 such that the plane of displacement of cutting edge 5 extends through the spinal column 15.

Figure 4:
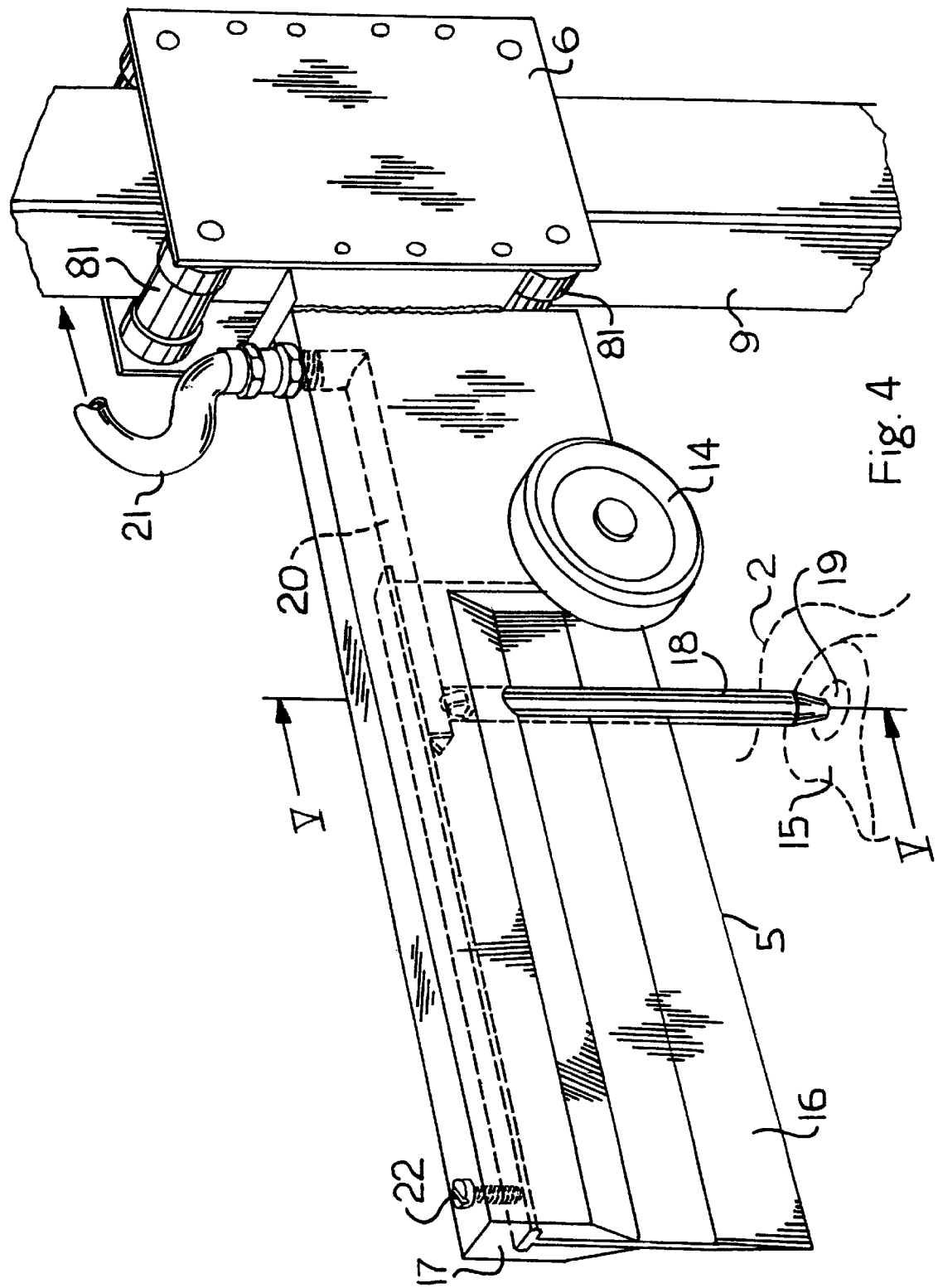
FIG. 4 shows a perspective view of a knife with a positioning pin cum suction pin.

FIG. 4 shows an embodiment wherein the knife comprises a blade 16 which is carried by a holder 17. Added to the knife is a hollow pin 18 which serves for insertion into the cavity 19 in spinal column 15 containing the spinal marrow. The pin 18, which is open on the leading side, is connected via a channel 20 and a flexible conduit 21 to a suction pump (not shown) for extracting spinal marrow.

The roller 14 can also be placed lower. In this case it can assist in inserting of pin 18 into the spinal marrow cavity 19. For elucidation in this respect reference is made to FIG. 18.

Figure 5:
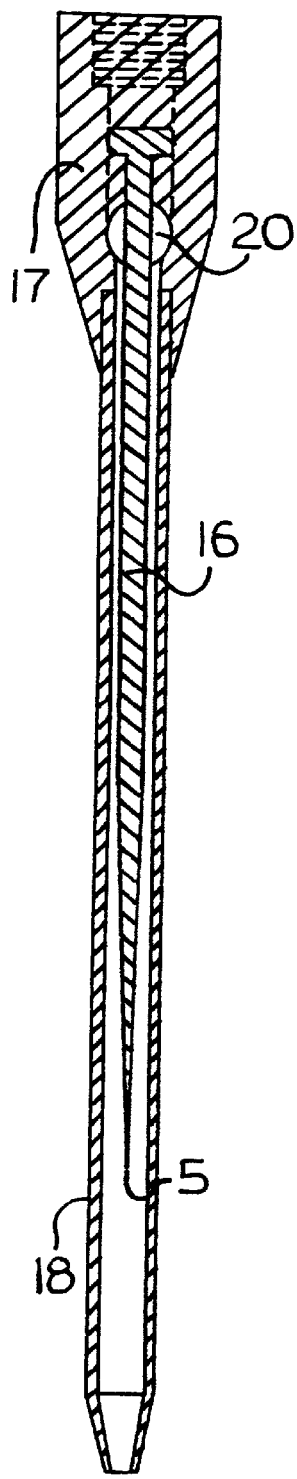
FIG. 5 shows the cross section V—V according to FIG. 4.

FIG. 5 shows the cross sectional shape of the pin 18. At the top the knife blade 16 generally has a T-shape so that in lengthwise direction the knife can slide in and out of the correspondingly shaped holder 17. A screw 22 serves for locking.

Figure 5A:
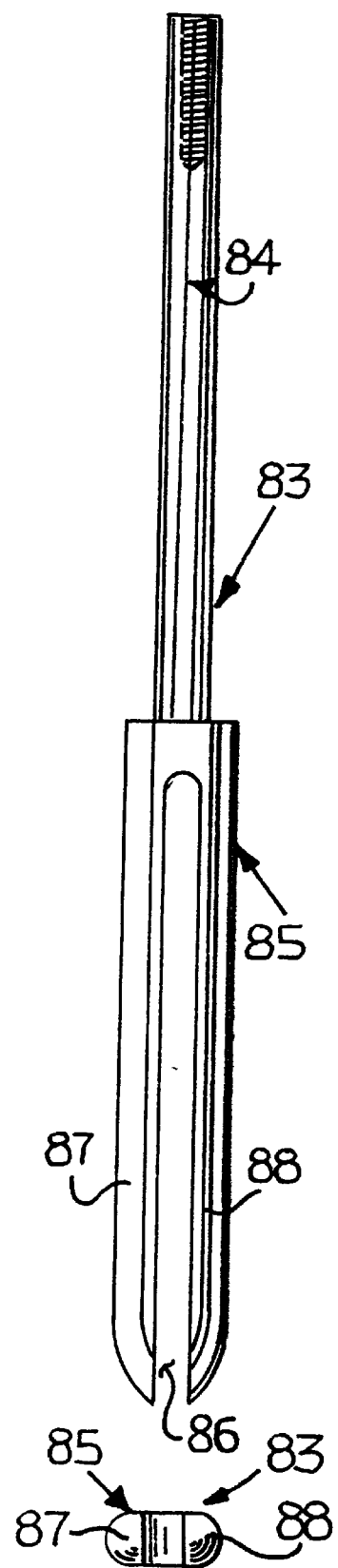
FIG. 5a is a side view and an end view of an alternative positioning pin.
Figure 5B:
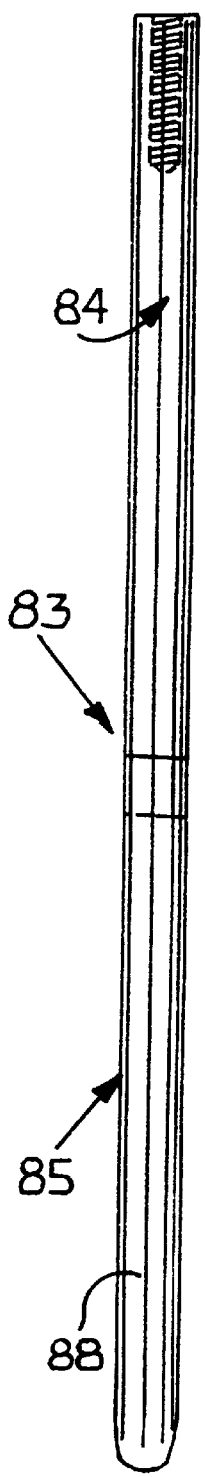

FIGS. 5a and 5b show a positioning pin 83 with a fixing stem 84 and an active end 85. At variance with the pin shown in for instance FIG. 5, the active end 85 takes a divided form. It consists of two segments 87, 88 which are mutually separated by a gap 86 and which are relatively thin and have a certain elasticity. They can be guided well through the walls of the spinal marrow cavity under a certain elastic compression which has a cross-section varying in longitudinal direction (see for instance FIG. 4). It is noted that all the drawn positioning pins display a certain narrowing on the leading part. This narrowing forms as it were a positioning edge which enhances the positioning and guiding function of the relevant pin.

FIGS. 6, 7, 8, 9, 10 and 11 show diverse possible forms of the knife blade and the holder.

FIGS. 12, 13 and 14 respectively show knife blades 23, 24, 25 with respective cutting edges 26, 27, 28. The cutting edges all have a shape varying from the straight line. The edge 26 has a serrated form; cutting edge 27 has a curved shape and cutting edge 28 has a bent form consisting of two straight parts.

Figure 15:
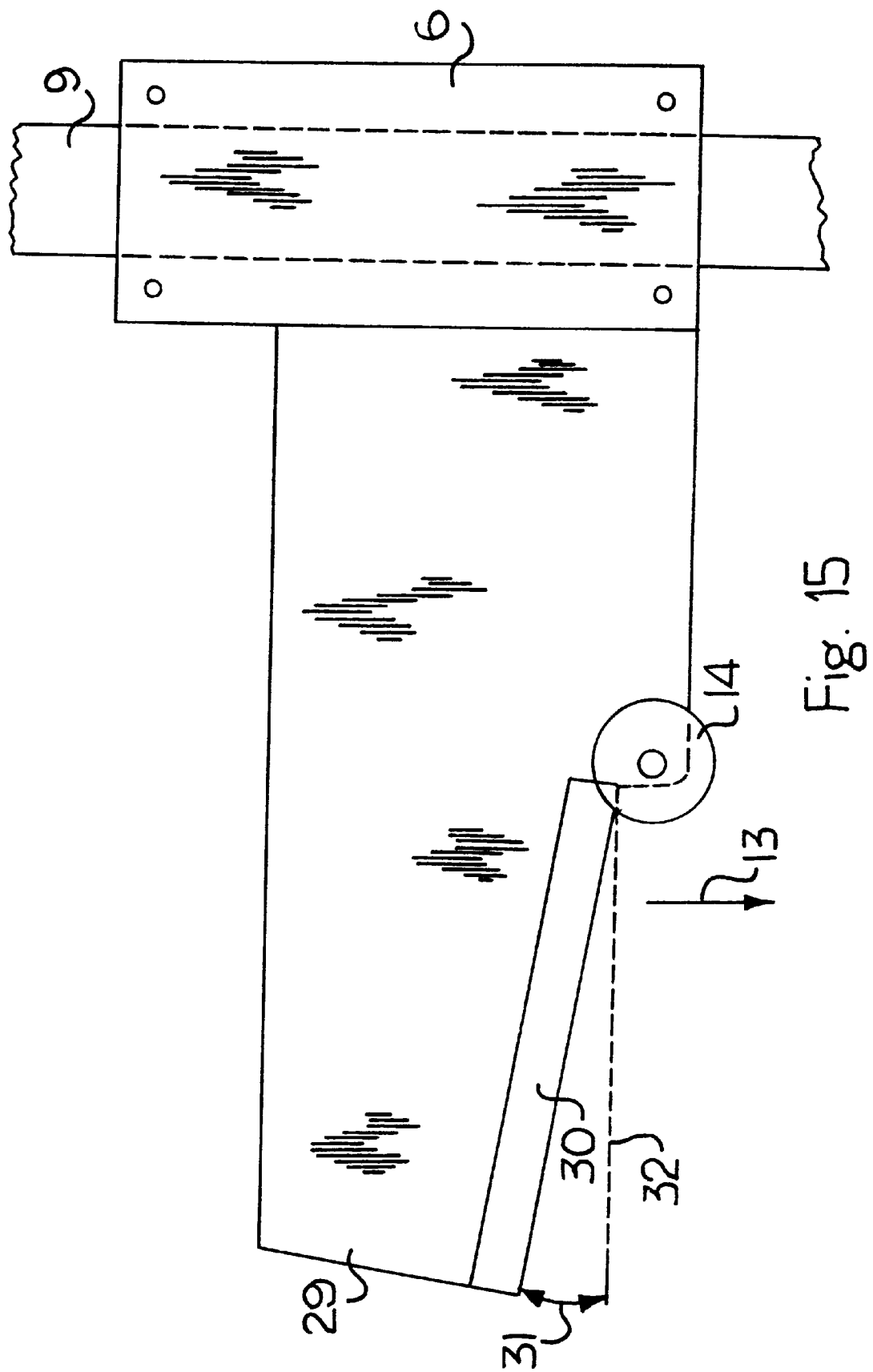
FIG. 15 is a side view of a different type of knife.

FIG. 15 shows knife 29, the cutting edge 30 of which forms an angle 31 with a line 32 extending perpendicularly of the direction of displacement 13.

Figure 16:
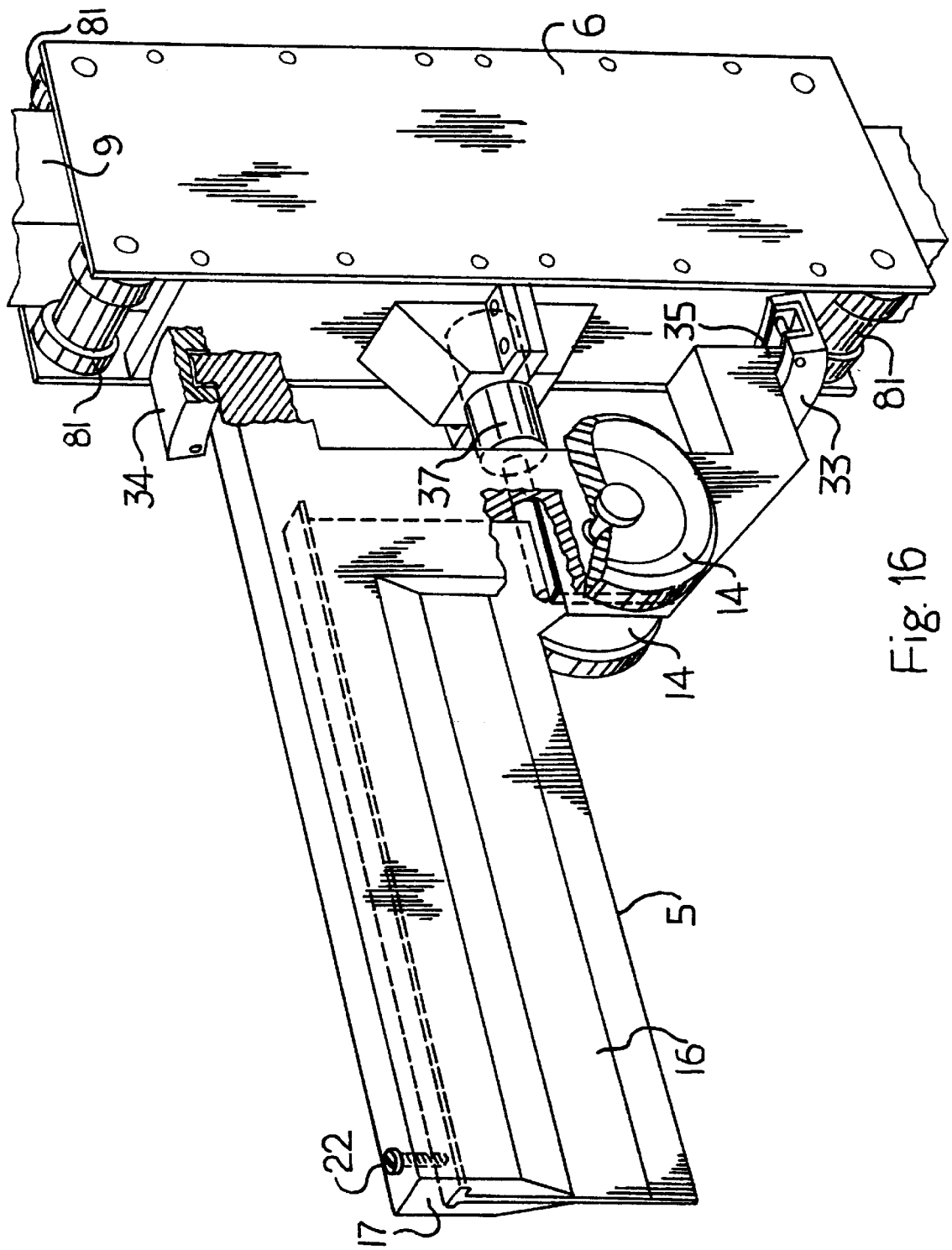
FIG. 16 shows a partly broken away perspective view of a knife pivotable in one direction.

FIG. 16 shows a structure wherein the holder 17 is pivotable round a substantially horizontal axis. For this purpose the holder 17 is rotatable relative to the carriage 6. This latter supports respective arcuate guide rails 33, 34 in which correspondingly shaped blocks 35, 36 connected to holder 17 are moveable. The rotation is controlled by a motor 37 which is connected to knife blade 16 and which can be controlled externally by means not drawn here.

Figure 17:
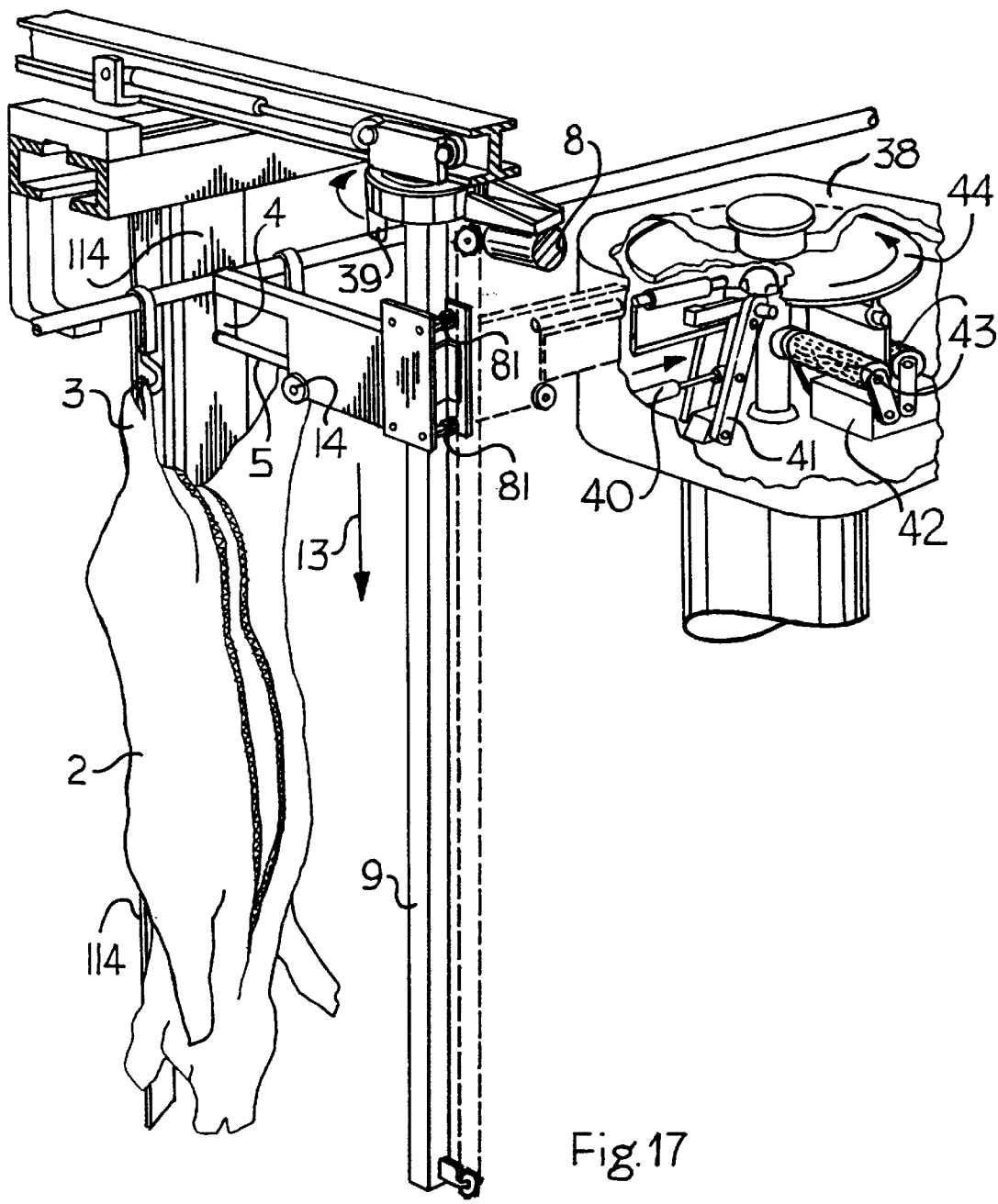
FIG. 17 is a view corresponding with FIG. 1 of a variant.

FIG. 17 shows an apparatus greatly resembling the apparatus according to FIG. 1, to which however are added means for changing the knives 4. The vertical guide 9 is rotatable for this purpose round its longitudinal axis by means of a motor 39 between the operational position drawn in full lines and the non-operational position indicated with broken lines in which a knife 4 can be taken out by means of a changing device 38 in order to be replaced by another knife. For this purpose use is made of a removing member 41 reciprocally movable by means of a cylinder 40. A knife inserted into the changing device 38 can be ground by means of a grinding device 42 with two rotatably driven grinding rollers 43. The knives are supported in the device 38 by a turntable 44. After the grinding operation a knife can remain stored for a time in device 38 in order to become operational again when desired.

Figure 18:
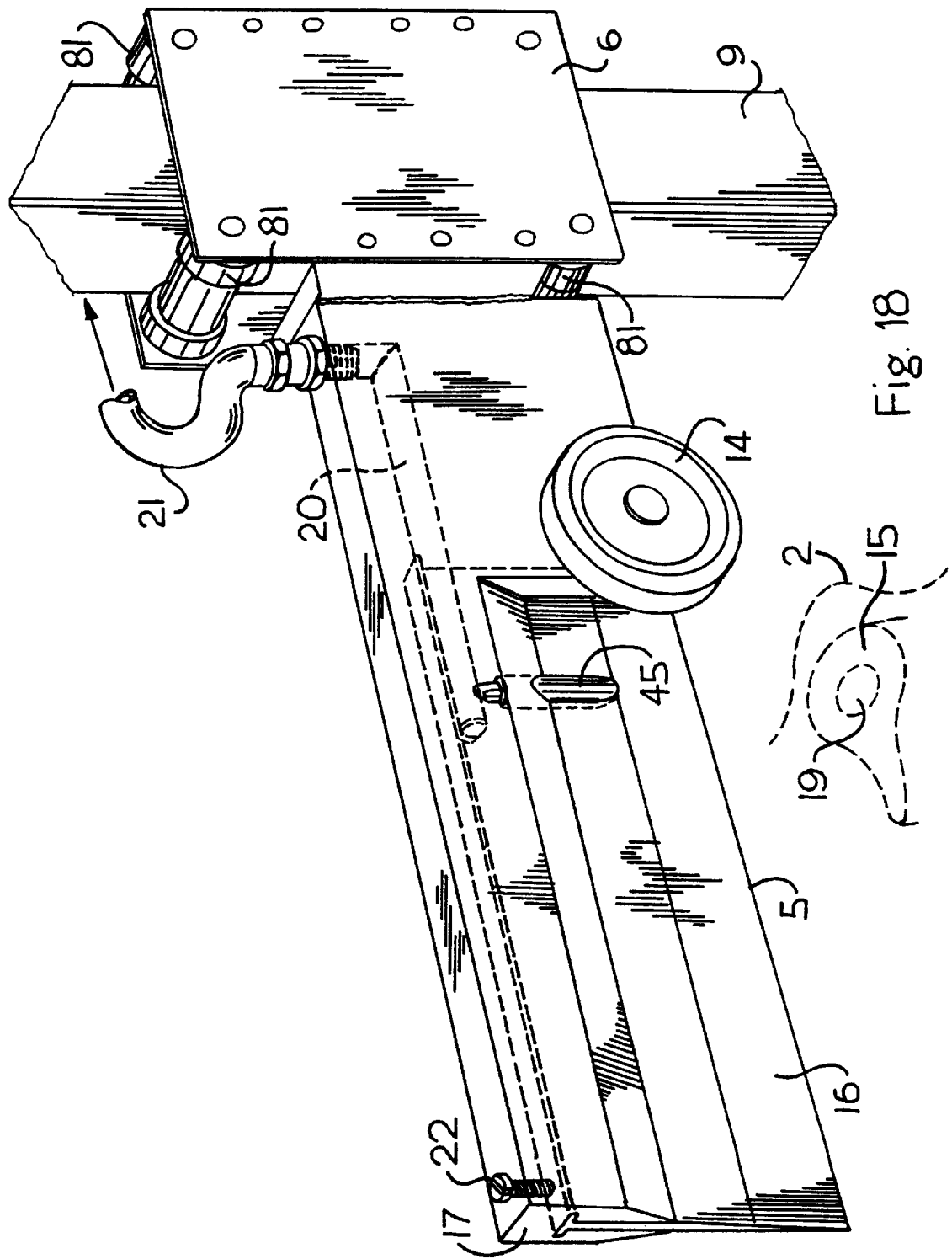
FIG. 18 is a view corresponding with FIG. 4 of another embodiment.

FIG. 18 shows a variant of FIG. 4. In this embodiment the pin 18 is replaced by a shorter pin 45 which does not protrude beyond the cutting edge 5 of the knife but ends in the region of the blade 16.

Figure 19:
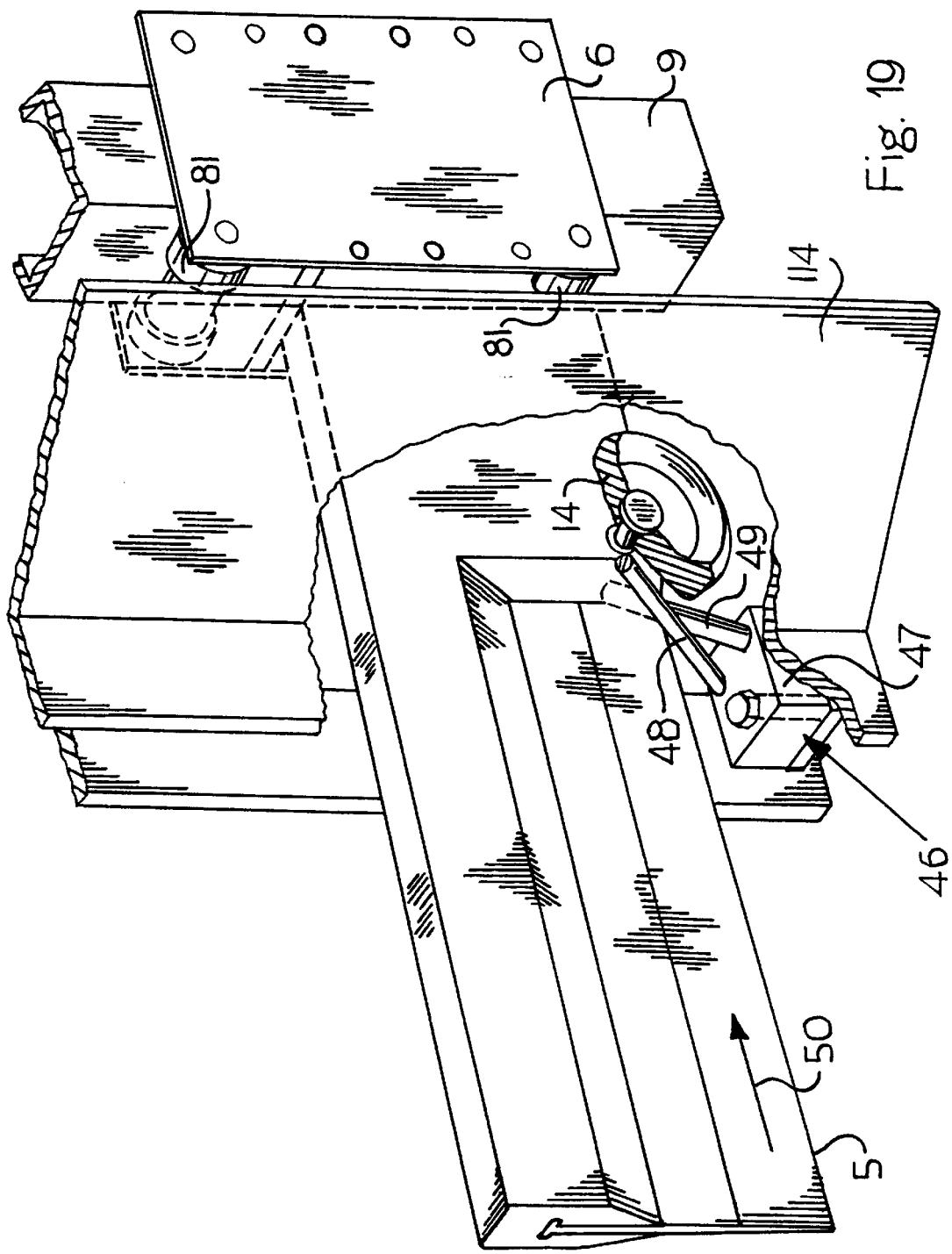
FIG. 19 is a view corresponding with FIG. 16 of an embodiment with grinding means.

FIG. 19 shows an embodiment wherein a fixedly disposed grinding device 46 is present. This grinding device comprises two ceramic rods 48, 49 which are supported by a block 47 and along which the cutting edge 5 of the knife is moved rearward as according to arrow 50 after a dividing operation. This movement according to arrow 50 takes place in the lowest position of the carriage 6 through relevant energizing of linear motor 12.

Figure 20:
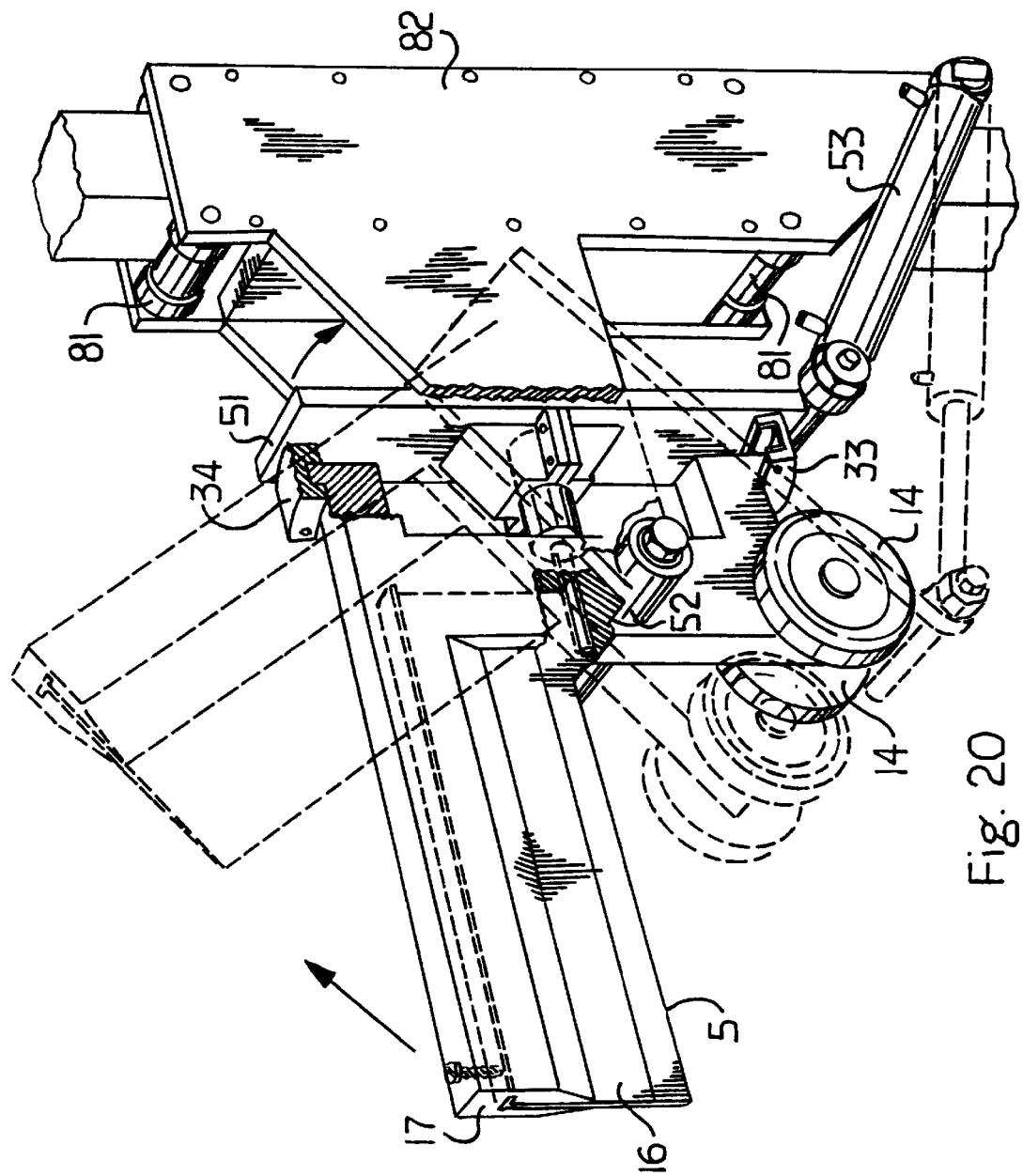
FIG. 20 is a view corresponding with FIG. 16 of a variant wherein the knife is also pivotable around a second direction independent of the first direction.

FIG. 20 shows an embodiment with an addition relative to FIG. 16. The holder 17 is supported by a support plate 51 which carries the guide rails 33, 34. The knife 16 is hereby pivotable in the manner shown in FIG. 16. By means of a pivot 52 the plate 51 is coupled to the carriage 82 which corresponds functionally with carriage 6 (see for instance FIG. 4) and plate 51 is pivotable in the vertical plane under the control of a remotely controllable hydraulic cylinder 53. Two possible corresponding positions of holder 17 and knife 16 are indicated in broken lines.

FIG. 20 does not show that knife 16 can also perform a pivoting movement round the axis defined by the motor 37 and the guides 33, 35; 34, 36. This pivoting movement is independent of the pivoting shown in FIG. 20 round the axis defined by the pivot 52.

FIG. 21 shows a knife 54 comprising a support bracket 55 which supports knife blade 56 on three sides, whereby bending is effectively prevented. For the sake of completeness and for the highest possible technical reliability the thin blade 56 is biased in the region of its cutting edge 5 by means of tensioning means 57.

The bracket 55 has on the top a prismatic profile with a generally T-shape.

FIG. 22 shows the manner in which the knife 54 of FIG. 21 can be incorporated in a correspondingly shaped holder 58.

Figure 23:
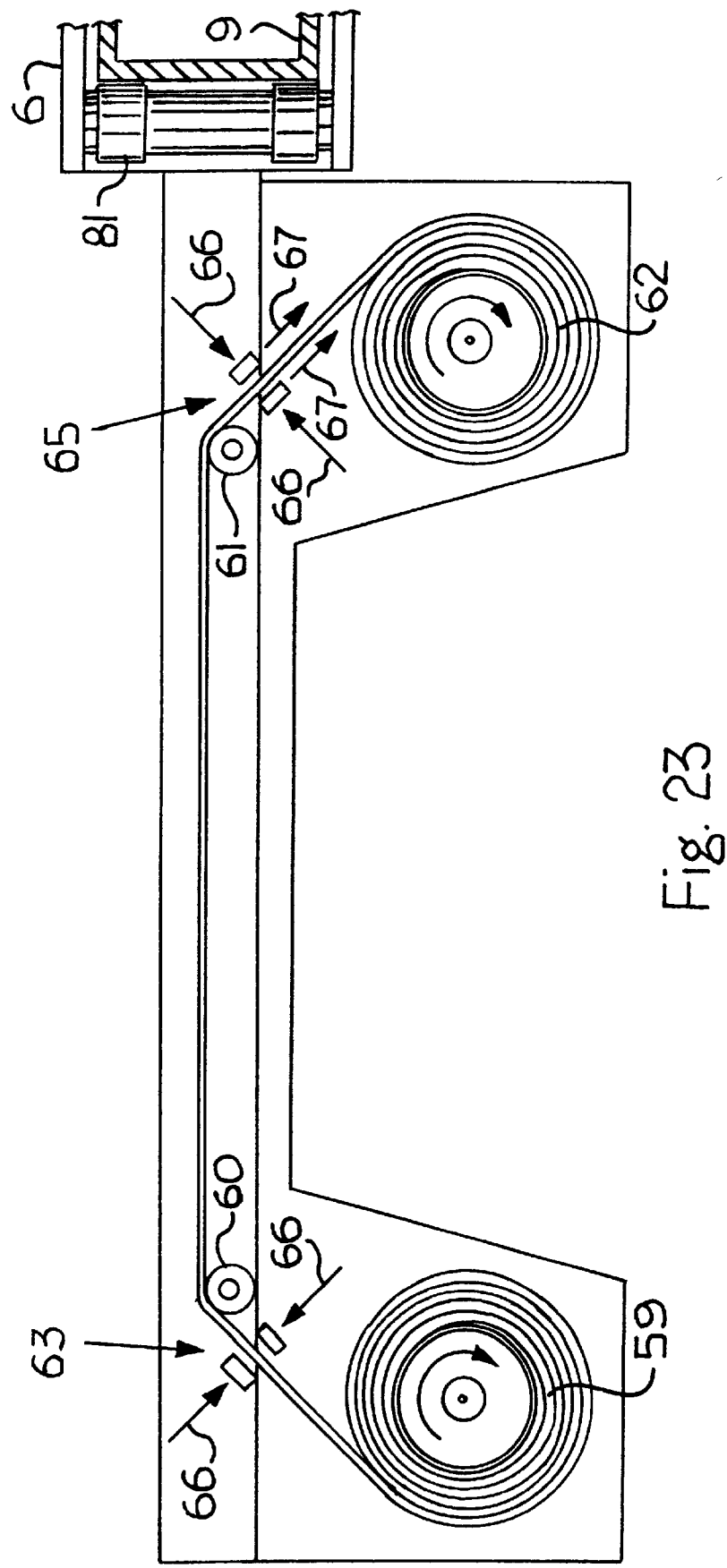
FIG. 23 is a schematic bottom view of a windable and unwindable ribbon knife.

FIG. 23 shows an alternative in which a knife is embodied in the form of a ribbon. The ribbon is initially wound onto a stock roll 59, is held in straight position in its active zone via guides 60, 61 and is then wound up onto a winding roll 62. First clamping means 63 clamp the ribbon 64 fixedly between roll 59 and guide 60. Second clamping means 65 clamp the ribbon 64 fixedly between guide 61 and roll 62. The relevant clamping forces are designated with arrows 66. After activation of said clamping means 63 and 65 a displacement of the second clamping means 65 takes place as indicated by arrows 67, whereby the ribbon is tautly tensioned in the active zone between guides 60 and 61.

Figure 24:
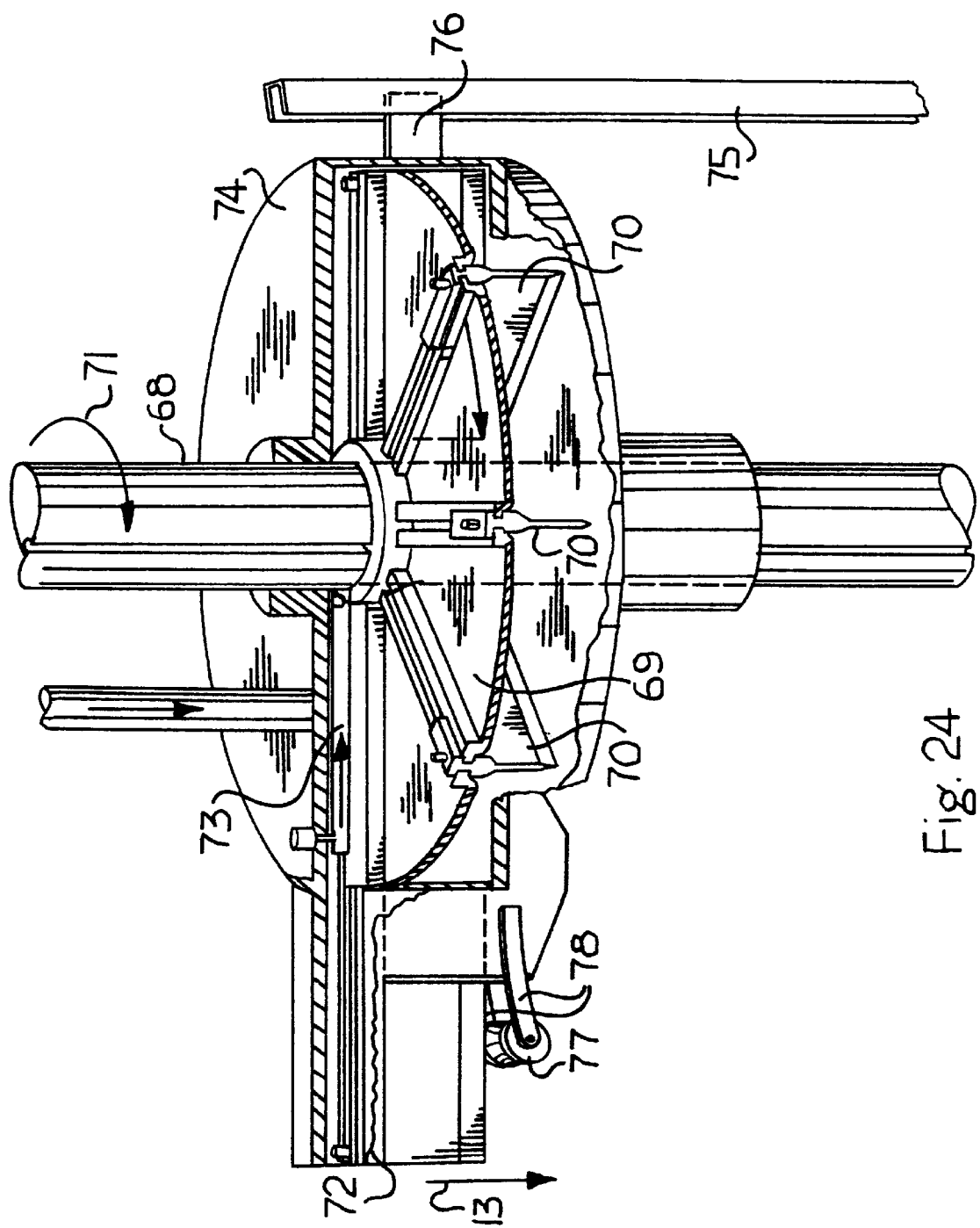
FIG. 24 shows a partly broken away perspective view of a variant.

FIG. 24 shows an embodiment in which a vertical guide 68 supports a turntable 69 in which knives 70 are stored which are temporarily not in use. By rotating the vertical guide 68 as according to arrow 71 a knife 70 can be placed in line with a knife holder 72. A preceding knife can be removed and a new knife for insertion can be placed. Control of this cycle takes place by means of a cylinder 73. Locking of a housing 74 supporting holder 72 against rotation together with the guide 68 is ensured by a vertical guide rail 75 with which a protrusion 76 arranged on housing 74 co-acts.

As an alternative to the turntable structure according to FIG. 24, use can also be made of a cassette-like structure in which the knives are ordered successively and thus form a stack, wherein the flat surfaces of the knife blades face toward each other.

FIG. 24 further shows that the knife holder 72 supports a guide roller 77. This is connected to holder 72 by means of two spring steel strips 78.

Figure 25:
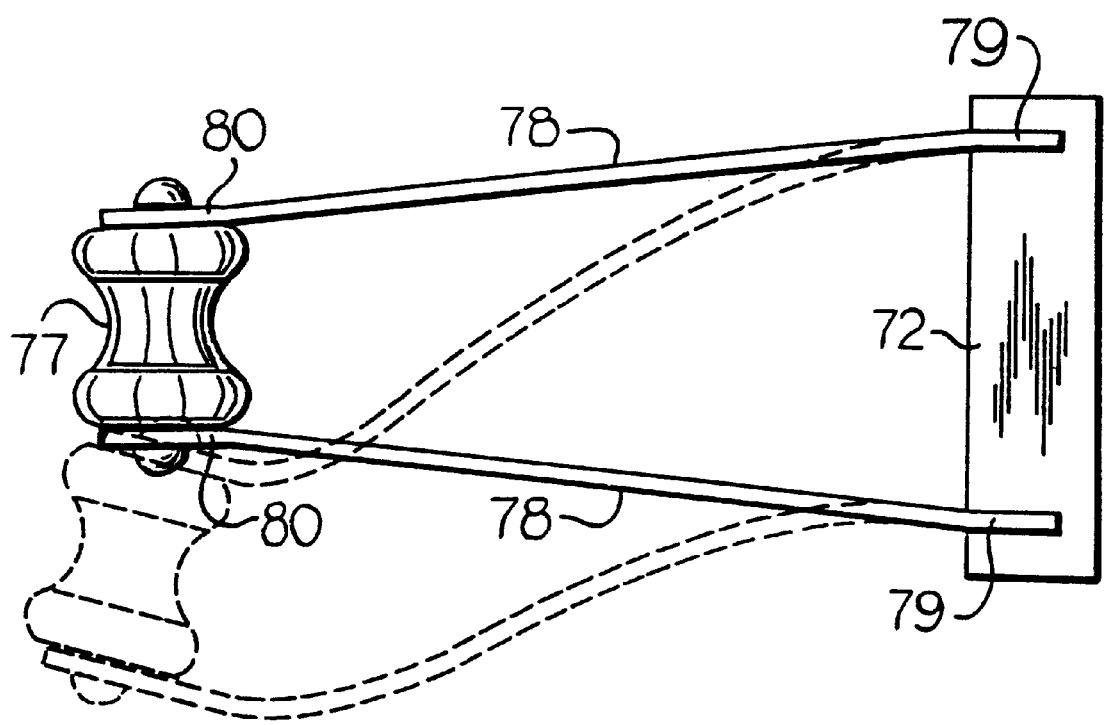
FIGS. 25 and 26 show suspensions for guide rollers applied in the embodiment of FIG. 24.

FIG. 25 shows this structure on enlarged scale. The strips 78 are disposed such that their main surfaces are more or less parallel to the direction of movement 13 of the cutting edge. The first ends 79 of strips 78 are fixedly connected to holder 72, i.e. they have a fixed mutual distance and a fixed mutual position. The respective second ends 80 support the guide roller 77 between them. The mutual distance between the first ends 79 is greater than that between the second ends 80. These second ends 80 also have a fixed mutual spatial relation. As shown in FIG. 25, the strips 78 deform when the roller 77 makes a sideways movement in the manner indicated. As shown in the drawing, the virtual pivot zone of roller 80 lies on the side remote from knife holder 72, whereby the roller 77 is self-adjusting.

Figure 26:
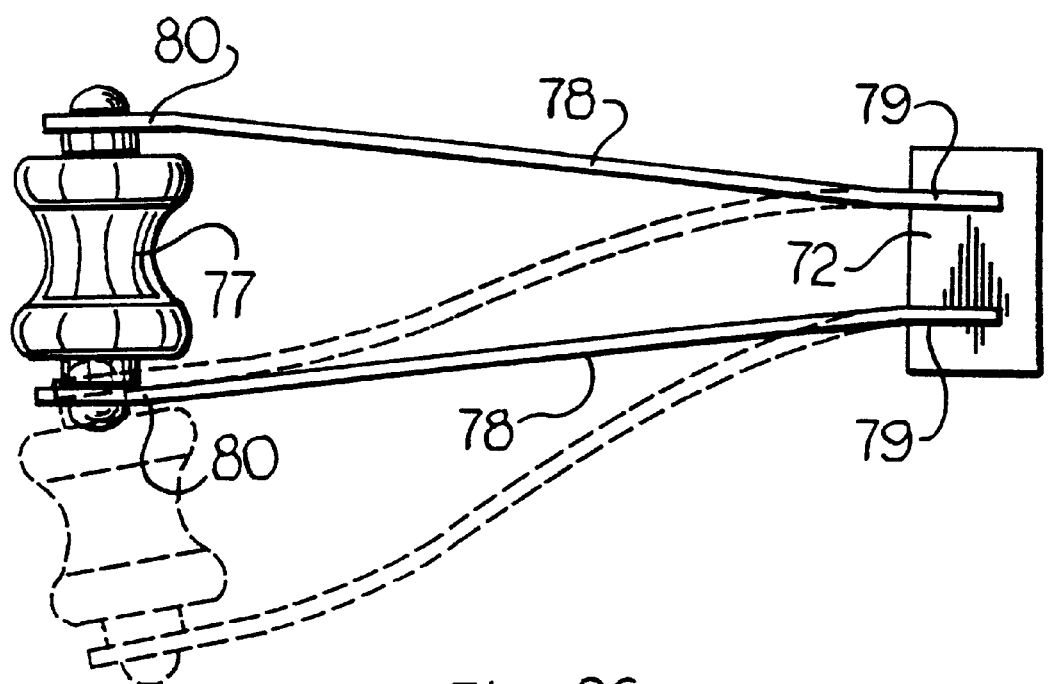

FIG. 26 shows an embodiment in which the strips 78 are disposed such that the pivot zone is situated on the side of knife holder 72, whereby the self-adjusting action according to FIG. 25, which is recommended, is not achieved. As is apparent, the first ends 79 of strips 78 in the embodiment of FIG. 26 have a smaller mutual distance than the second ends 80.

Figure 27:
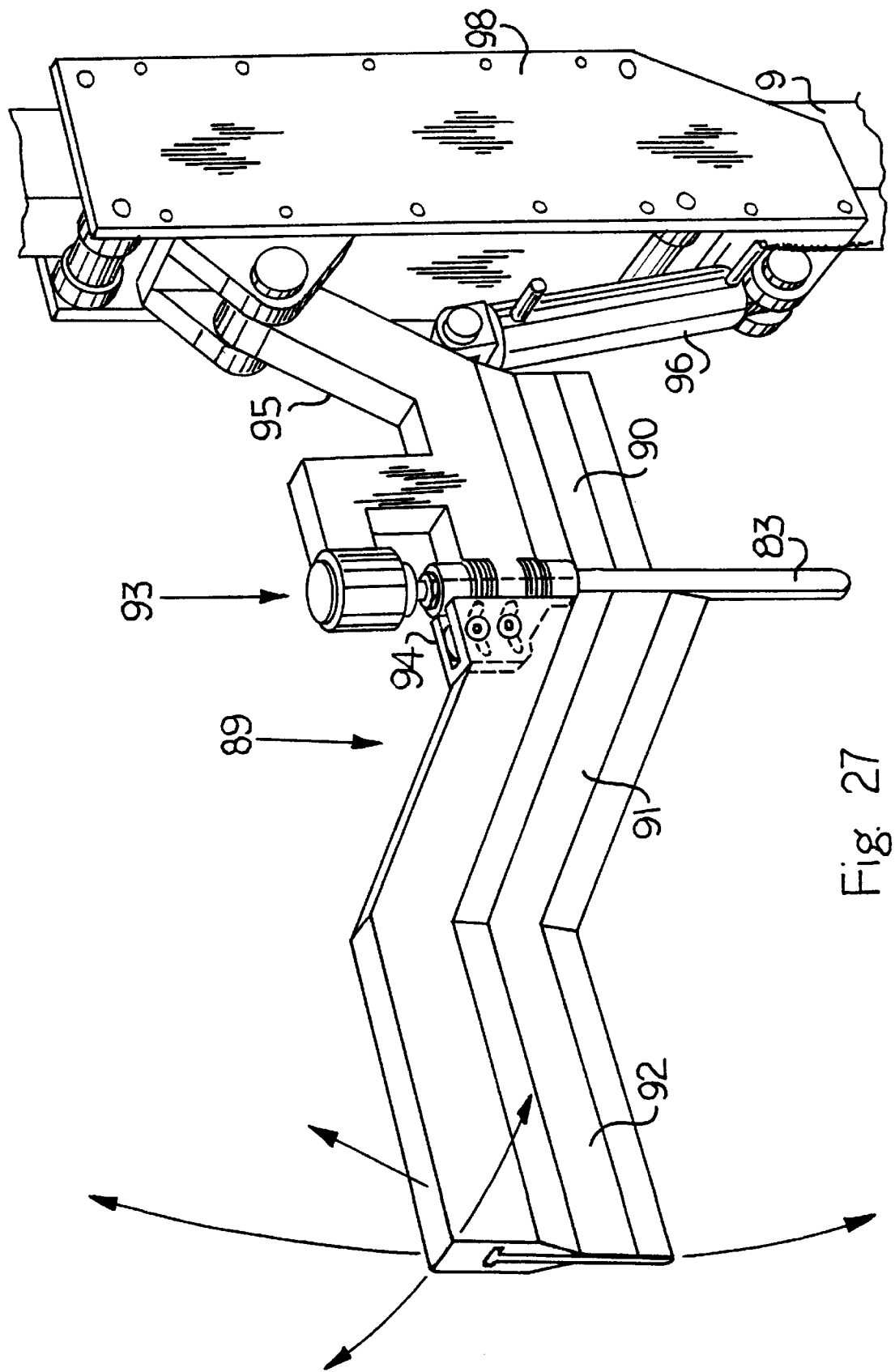
FIG. 27 is a view corresponding with FIG. 4 of a variant.

FIG. 27 shows a variant in which a carriage 98 guided along the vertical guide 9 carries a knife 89. Knife 89 takes a multiple form and comprises a first knife segment 90, a second knife segment 91 and a third knife segment 92.

The third knife segment 92 divides in first instance the pubic bone and subsequently makes with its point an opening in the spinal narrow channel. Subsequently the knife 89 is displaced in such a way that pin 83 is positioned above the spinal narrow channel after which in second instance the spinal column is divided by the first and second knife segments 90, 91. As shown in FIG. 27, the second knife segment 91 connects at respective angles to the other two knife segments 90 and 92.

By means of screw means 93 the longitudinal position of segments 91, 92 is adjustable relative to the longitudinal position of knife segment 90. The knife segments 91, 92 are also rotatable around pin 83, so that they can make an adjustable angle of a maximum of about 90° relative to knife segment 90.

By means of a pivot construction 94 the knife segments 91, 92 can also assume an angular position other than that shown relative to knife segment 90.

A bracket 95 pivotally connected to carriage 98 supports the segments 90, 91, 92. A hydraulic cylinder 96 or other column of adjustable length is pivotally connected on one side to carriage 98 and pivotally connected on the other side to bracket 95. The angular position of the knife 90, 91, 92 can herewith be adjusted relative to guide 9.

Different from the arrangements shown in FIGS. 1 and 27 the guide 9 for the knife may equally well be arranged at the back side of the slaughtered animal.

It is apparent from the short description above that the mutual positions and angular positions are adjustable in different ways and fixable in selected positions. If desired, a force sensor can for instance be coupled to hydraulic cylinder 96, which sensor ensures that when a selected maximum value of the permissible force is exceeded a change of the adjustment of the apparatus takes place such that the relevant force is terminated or at least reduced.

What is claimed is:

1. An apparatus for dividing a piece of meat containing at least one elongate bone structure such that this bone structure is also divided, which apparatus comprises:

guiding means;

positioning means for positioning the piece of meat;

dividing means for dividing a positioned piece of meat, wherein the dividing means comprise a knife having a principal plane and having a blade with a leading cutting edge; and displacement means for displacing said knife only in a continuous forwardly directed movement substantially in the principal plane of the blade during cutting, such that a plane of displacement defined by the cutting edge extends in a longitudinal direction through the bone structure, and wherein the knife is guided relative to the positioning means by the guiding means, and wherein the displacement means are adapted to displace the knife only in a continuously forward directed movement during cutting.

2. An apparatus as claimed in claim 1, wherein the displacement means are configured to superimpose, at a substantially uniform speed, a speed component varying in time to overcome a locally increased resistance during cutting.

3. An apparatus as claimed in claim 1, wherein the positioning means are configured to position at least a part of a slaughtered animal and the elongate bone structure comprises the spinal column of the animal, and wherein said plane of displacement extends through the spinal column of the animal.

4. The apparatus as claimed in claim 3, wherein the division begins in the groin of the animal.

5. An apparatus as claimed in claim 1, wherein the cutting edge has a shape varying from a straight line.

6. An apparatus as claimed in claim 5, wherein the cutting edge comprises at least two non-collinear parts.

7. An apparatus as claimed in claim 1, wherein the cutting edge has a middle zone with a recessive form in the middle zone.

8. An apparatus as claimed in claim 1, wherein the cutting edge forms an angle varying from 0° with a plane perpendicular to a direction of displacement of the knife.

9. An apparatus as claimed in claim 8, further including adjusting means for adjusting said angle.

10. An apparatus as claimed in claim 9, wherein the adjusting means are invariable such that at each displacement position of the knife, the knife forms a preselected angle with the perpendicular plane.

11. An apparatus as claimed in claim 9, wherein the adjusting means comprise control means.

12. An apparatus as claimed in claim 1, wherein at least a zone of the knife adjoining the cutting edge is biased with a tensile stress which is exerted on the blade substantially parallel to the cutting edge.

13. An apparatus as claimed in claim 1, wherein the knife comprises a flexible strip, which is transportable via an active zone from a stock roll to a winding roll.

14. An apparatus as claimed in claim 1, wherein the knife comprises ceramic material at least in a region of the cutting edge.

15. An apparatus as claimed in claim 1, wherein the dividing means comprise at least one guide for urging toward a spinal column substantially transversely of a displacement direction of the knife.

16. An apparatus as claimed in claim 15, wherein the guide comprises a guide roller.

17. An apparatus as claimed in claim 16, including two resilient strips having first ends and second ends, the principal planes of which are substantially parallel to a direction of movement of the cutting edge, wherein the respective first ends of these strips have a fixed relative spatial relation to the knife and are thus moveable together therewith, and the respective second ends support the guide roller between them, wherein the mutual distance between the first ends differs from the mutual distance between the second ends, and wherein the first ends have a fixed mutual spatial relation and the second ends have a fixed mutual spatial relation.

18. An apparatus as claimed in claim 1, wherein the knife is pivotable round a rotation zone extending substantially in a plane of displacement of the knife.

19. An apparatus as claimed in claim 18, wherein the rotation zone lies in the displacement direction in front of the cutting edge.

20. An apparatus as claimed in claim 18, wherein the knife has a rest position and is urged toward the rest position in the principal plane by resetting means.

21. An apparatus as claimed in claim 1, including a positioning pin which is moveable together with the knife in the region of the knife and which is intended for insertion into a cavity containing marrow in an elongate bone structure present in the piece of meat.

22. An apparatus as claimed in claim 21, wherein the pin has at least two longitudinal segments.

23. An apparatus as claimed in claim 1, wherein the knife includes suction means for extracting marrow from a cavity present in the elongate bone structure.

24. An apparatus as claimed in claim 23, wherein the knife displays a thickening which comprises a suction opening.

25. An apparatus as claimed in claim 23, wherein the blade includes a positioning pin, wherein the pin is hollow, forms part of the suction means and includes at least one suction opening.

26. An apparatus as claimed in claim 21 including suction means, wherein the pin is hollow, forms a part of the suction means and includes at least one suction opening.

27. An apparatus as claimed in claim 1, wherein the knife comprises a first, a second and a third knife segment;

which second knife segment extends at an angle relative to the other knife segments; and wherein the mutual angular positions and the positions of each knife segment are adjustable and fixable in selected positions.

28. An apparatus as claimed in claim 1, wherein the knife is removably carried by an operational holder.

29. An apparatus as claimed in claim 28, wherein the operational holder has outer surfaces connecting onto outer surfaces of the knife.

30. An apparatus as claimed in claim 28, including at least one storage holder for holding at least one knife, in addition to transporting means for removing a knife from the operational holder and transporting the knife to the storage holder and for removing a knife from the storage holder and transporting the knife to the operational holder.

31. An apparatus as claimed in claim 1, including grinding means adjacent the displacement means for grinding the knife.

32. An apparatus as claimed in claim 31, wherein the displacement means are configured to transport the cutting edge along a grinding member substantially in a longitudinal direction of the cutting edge.

33. The apparatus as claimed in claim 1, wherein the knife comprises a flexible strip having a finite length, wherein the strip is movable between a stock roll and a winding roll and wherein the strip is non-movably clamped in the dividing means during cutting.

34. An apparatus for dividing a piece of meat containing at least one elongate bone structure, such that this elongate bone structure is also divided, which apparatus comprises:

displacement means;

positioning means for positioning the piece of meat; and dividing means for dividing a positioned piece of meat;

wherein the dividing means are displaceable by means of the displacement means, wherein said elongate bone structure comprises the spinal column of a slaughtered animal for dividing, and wherein the dividing means includes suction means for extracting spinal marrow from the spinal column.

35. An apparatus for dividing a piece of meat containing at least one elongate bone structure such that this elongate bone structure is also divided, which apparatus comprises:

positioning means for positioning the piece of meat; and dividing means for dividing a positioned piece of meat;

wherein the dividing means are displaceable, wherein the dividing means comprise a mechanical dividing member, which dividing member is removably carried by an operational holder, and the apparatus is provided with at least one storage holder for holding in storage at least one dividing member, in addition to transporting means for removing a dividing member from the operational holder and transporting the dividing member to the storage holder and for removing a dividing member from the storage holder and transporting the dividing member to the operational holder.

36. An apparatus for dividing a piece of meat containing at least one elongate bone structure such that this elongate bone structure is also divided, which apparatus comprises:

positioning means for positioning the piece of meat; and dividing means for dividing a positioned piece of meat;

wherein the dividing means are displaceable and comprise a knife, which knife comprises a flexible strip having a finite length which is transportable via an active zone from a stock roll to a winding roll and which strip is non-movably clamped in the dividing means during cutting.

* * * * *